United States Patent
Dharmalingam et al.

(10) Patent No.: US 9,607,029 B1
(45) Date of Patent: Mar. 28, 2017

(54) OPTIMIZED MAPPING OF DOCUMENTS TO CANDIDATE DUPLICATE DOCUMENTS IN A DOCUMENT CORPUS

(71) Applicant: Amazon Technologies, Inc., Seattle, WA (US)

(72) Inventors: Sivaranjini Dharmalingam, Seattle, WA (US); Nathan Thomas Close, Seattle, WA (US); Shantanu Shailendrakumar Fauji, Seattle, WA (US); Sean Gwizdak, Edmonds, WA (US); Jiahui Jiang, Urbana, IL (US); Yohan Mammen, Renton, WA (US); Roshan Rammohan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 14/573,849

(22) Filed: Dec. 17, 2014

(51) Int. Cl.
*G06F 17/30* (2006.01)

(52) U.S. Cl.
CPC .............................. *G06F 17/30324* (2013.01)

(58) Field of Classification Search
CPC ......... G06F 17/30067; G06F 17/30135; G06F 17/30138; G06F 17/30153; G06F 17/30156; G06F 17/30324; G06F 17/30864; G06F 3/0641; H03M 7/30

USPC ......................................... 707/692, 741, 742
See application file for complete search history.

(56) References Cited

U.S. PATENT DOCUMENTS

| | | | |
|---|---|---|---|
| 7,392,262 B1 * | 6/2008 | Alspector | G06F 17/30011 |
| 7,895,255 B2 * | 2/2011 | Drewes | G06F 7/52 |
| | | | 708/208 |
| 8,015,162 B2 * | 9/2011 | Henzinger | G06F 17/2211 |
| | | | 707/692 |
| 8,046,372 B1 | 10/2011 | Thirumalai et al. | |
| 2012/0209853 A1 * | 8/2012 | Desai | G06F 17/30613 |
| | | | 707/741 |
| 2012/0303622 A1 * | 11/2012 | Dean | G06F 17/3071 |
| | | | 707/737 |
| 2015/0205885 A1 * | 7/2015 | Zhou | G06F 17/30622 |
| | | | 707/742 |

* cited by examiner

*Primary Examiner* — Greta Robinson
(74) *Attorney, Agent, or Firm* — Lee & Hayes, PLLC

(57) ABSTRACT

Technologies are disclosed for mapping documents to candidate duplicate documents in a document corpus. A bitset optimized inverted index is created for a document corpus. A document is received for which candidate duplicate documents in the document corpus are to be identified. The document is tokenized using adaptive tokenization. A determination made as to whether tokens in the document are represented in the bitset optimized inverted index. A list of candidate duplicate documents is created for tokens represented in the optimized inverted index utilizing in-memory bitsets that map tokens to documents that contain the tokens in the document corpus.

20 Claims, 9 Drawing Sheets

OPTIMIZED MAPPING OF DOCUMENTS TO CANDIDATE DUPLICATE DOCUMENTS IN A DOCUMENT CORPUS

BACKGROUND

There are many different scenarios where it is desirable to identify documents in a document corpus that are duplicates of another document. As one specific example, an electronic commerce ("e-commerce") merchant might maintain a document corpus containing a large number of documents that store data describing products available from the merchant. In this scenario, it may be desirable to identify duplicate documents in the document corpus in order to avoid confusing customers by presenting different records for the same product. Duplicate documents that are identified in the document corpus may be merged in order to eliminate any duplication.

As another example, when an e-commerce merchant receives a document identifying a new product from a vendor for inclusion in the document corpus, it may be desirable to determine whether a document already exists in the document corpus that corresponds to the new product (i.e. is a duplicate of the document submitted by the vendor). If a duplicate document already exists in the corpus, a new document will not be created in the corpus for the product. If, however, a duplicate document does not already exist in the corpus, the document for the new product may be added to the corpus. In other scenarios, it might also be desirable to identify the duplicate documents contained in two or more document corpora.

Traditional mechanisms for identifying duplicate documents, such as those that attempt to identify duplicate documents based upon the frequency of terms contained therein, do not perform well for document corpora having millions or even hundreds of millions of documents. The disclosure made herein is presented with respect to these and other considerations.

DETAILED DESCRIPTION

Figure 1:
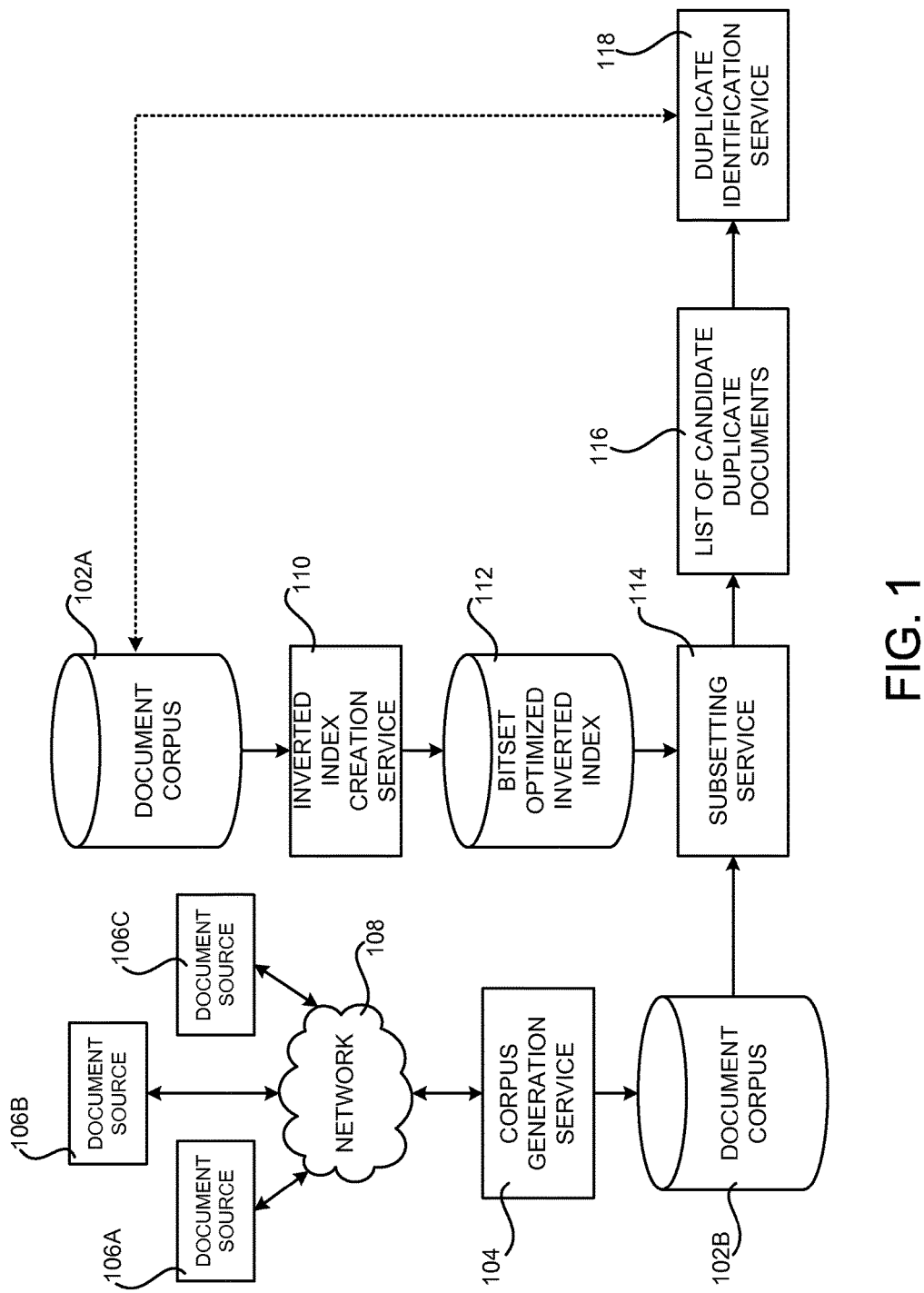
FIG. 1 is a system architecture diagram showing aspects of the configuration and operation of several components described herein for mapping documents to candidate duplicate documents in a document corpus.

The following detailed description is directed to technologies for optimized mapping of documents to candidate duplicate documents in a document corpus. Utilizing an implementation of the technologies described herein, candidate duplicates of a document that are contained in a document corpus can be identified in a memory efficient and precise manner, even when the document corpus contains tens or even hundreds of millions of documents. The mechanisms disclosed herein can be utilized to identify candidate duplicate documents contained within a single document corpus or within two or more document corpora.

According to one configuration presented herein, a mechanism is provided for identifying candidate duplicate documents in a document corpus that utilizes a bitset optimized inverted index for the documents in the document corpus. The bitset optimized inverted index is created by first tokenizing the documents in the document corpus to identify textual tokens contained therein. In one configuration, adaptive tokenization is utilized to tokenize the documents. Adaptive tokenization refers to a process by which one or more tokenization techniques might be selected and utilized based upon various attributes of the document. For example, an orthogonal space bigram tokenization technique and/or an n-gram tokenization technique might be selected for tokenizing certain attributes of a document based upon the content of those attributes. Entity identification might also be utilized. Other tokenization techniques might also be selected and utilized on a per attribute basis.

Once the documents in the document corpus have been tokenized, a bitset is associated with each of the tokens in a memory of a computer. A bitset is an array of binary digits ("bits") having a number of bits equal to the number of documents in the document corpus. Each bit in each bitset corresponds to a unique document in the document corpus. In order to enable this functionality, the documents in the document corpus may be assigned a unique integer. A data structure might then be created and maintained that indicates the association between bits in the bitsets and the integers assigned to the documents in the document corpus.

In order to set the bits in the bitsets, a determination is made for each bit as to whether the token associated with the bitset containing the bit appears in the document in the document corpus that is associated with the bit. If the token appears in a document associated with a bit, that bit is set in a manner to indicate that the associated token is contained in the document. In one configuration, a bit is set to '1' to indicate that the associated token is found in the corresponding document. In another configuration, a bit is set to '0' to indicate that the associated token is found in the corresponding document. The bitsets may be compressed to optimize the utilization of the available memory of the computer.

Once the bitsets have been created, the bitset optimized inverted index can be utilized to identify candidate duplicate documents in the document corpus. For example, and without limitation, a request might be received to identify the documents in the document corpus that are likely to be duplicate documents of another document. The document for which duplicates are to be identified ("the document") might be contained in the document corpus that is to be evaluated for duplicates, in another document corpus, or received from an external source.

In response to receiving such a request, the document may be tokenized using the adaptive tokenization process described briefly above. Once the document has been tokenized, the tokens contained in the documents in the document corpus may be searched for the tokens in the document to identify any tokens that are contained in the document and also in at least one document in the document corpus. The bitsets associated with the identified tokens may then be utilized to select documents in the document corpus as candidate duplicate documents of the document. In this way, a list of candidate duplicate documents can be created. The list of candidate duplicate documents might be scored, sorted and filtered.

The list of candidate duplicate documents might also be provided to a duplicate identification service for detection of the documents in the document corpus that are actual duplicates of the document. This list of candidate duplicate documents might also be utilized in other ways in other configurations. Additional details regarding the various components and processes described briefly above for mapping documents to candidate duplicate documents in a document corpus will be presented below with regard to FIGS. 1-9.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of several components described herein for mapping documents to candidate duplicate documents in a document corpus. As shown in FIG. 1, a document corpus 102A may be created and maintained. The document corpus 102A contains documents and may be stored by a computer as a data store, database, or in another manner.

In one particular implementation, the documents in the document corpus 102A are product records corresponding to products available from an e-commerce merchant (not shown in FIG. 1). In this implementation, the documents include semi-structured data corresponding to various attributes of the products. For example, the documents might include a "name" attribute storing data that defines a name of a product. The documents might similarly include a "description" attribute storing a textual description of a product. The documents might also include other attributes (which might also be referred to herein as "fields") containing other types of data describing various aspects of a product. Although the various configurations described herein are presented primarily in the context of a document corpus 102A storing documents containing semi-structured product data, it should be appreciated that the technologies disclosed herein can be utilized with documents other than product records.

As will be described in greater detail below, the technologies disclosed herein can be utilized to generate a list 116 of candidate duplicate documents within the document corpus 102A of a given document. For example, and without limitation, the technologies disclosed herein might be utilized to identify duplicate product records within the document corpus 102A and to eliminate the duplicates. In this example, the document for which candidate duplicates are to be identified within the document corpus 102A is selected among the documents within the document corpus 102A itself. In another configuration, the document for which candidate duplicates are to be identified in the document corpus 102A is selected from documents in another document corpus, such as the document corpus 102B. In yet another configuration, the document for which duplicates are to be identified in the document corpus 102A is received from another source, such as from a vendor that desires to add a new document (i.e. a new product record) to the document corpus 102A. The technologies disclosed herein might also be utilized to identify duplicate documents in the document corpus 102B. Other applications of the technologies disclosed herein might also be made.

As also shown in FIG. 1 and described briefly above, another document corpus 102B might also be utilized in various configurations. In the example shown in FIG. 1, the document corpus 102B is generated by a corpus generation service 104. In one configuration, the corpus generation service 104 is a network service that is configured to search (e.g. "crawl") document sources 106A-106C that are accessible through a distributed network 108, such as the Internet, for documents of interest. In one particular implementation, the document sources 106 are Internet accessible e-commerce sites or product manufacturer sites and the documents of interest are product records. In this configuration, the corpus generation service 104 is configured to search the document sources 106 to obtain documents and to store the documents in the document corpus 102B. As will be described in greater detail below, the technologies disclosed herein might then be utilized to determine whether the documents contained in the document corpus 102B are duplicates of documents contained in the document corpus 102A. Various operations and/or workflows might be initiated depending upon whether a document in the document corpus 102B is a duplicate of one or more documents already contained in the document corpus 102A. Additional details regarding this process are provided below.

As also described briefly above, a bitset optimized inverted index 112 is utilized in some configurations to identify duplicates of a document that are contained in the document corpus 102A. In one configuration, an inverted index creation service 110 executes to create the bitset optimized inverted index 112 by first tokenizing the documents in the document corpus 102A to identify textual tokens contained therein. In one configuration, adaptive tokenization is utilized to tokenize the documents. Adaptive tokenization refers to a process by which one or more tokenization techniques might be selected and utilized based upon various attributes of the document. For example, an orthogonal space bigram tokenization technique and/or an n-gram tokenization technique might be selected for tokenizing certain attributes of a document based upon the content of the attributes. Other tokenization techniques might also be selected and utilized on a per attribute basis. Additional details regarding the adaptive tokenization process will be described below with regard to FIG. 5.

Once the documents in the document corpus 102A have been tokenized, a bitset is associated with each of the generated tokens in a memory of a computer. As discussed briefly above, a bitset is an array of bits that has a number of bits equal to the number of documents in the document corpus 102A. Each bit in each bitset corresponds to a unique document in the document corpus 102A. In order to enable this functionality, the documents in the document corpus 102A may be assigned a unique number and sorted based upon the assigned number. A data structure might then be created and maintained that indicates the association between bits in the bitsets and the unique identifiers for the documents in the document corpus 102A.

In order to set the bits in the bitsets, a determination is made for each bit as to whether the token associated with the bitset containing the bit appears in the document in the document corpus 102A that is associated with the bit. If the token appears in a document associated with a bit, that bit is set in a manner to indicate that the associated token is contained in the document. In one configuration, a bit is set to '1' to indicate that the associated token is found in the corresponding document. In another configuration, a bit is set to '0' to indicate that the associated token is found in the corresponding document. The bitset may be compressed to save space in the memory of the computer. Additional details regarding the creation of the bitset optimized inverted index 112 are provided below with regard to FIGS. 3 and 4.

Once the bitsets have been created, the bitset optimized inverted index 112 can be utilized to identify candidate duplicate documents in the document corpus 102A. For example, and without limitation, a request might be received to identify the documents in the document corpus 102A that are likely to be duplicate documents of another document. The document for which duplicates are to be identified ("the document") might be contained in the document corpus (e.g. the document corpus 102A or the document corpus 102B) that is to be evaluated for duplicates, in another document corpus, or received from an external source.

In response to receiving such a request, the document may be tokenized using the adaptive tokenization process described briefly above. Once the document has been tokenized, the tokens contained in the documents in the document corpus 102A may be searched for the tokens in the document to identify any tokens that are contained in the document and also in at least one document in the document corpus 102A. The bitsets associated with the identified tokens may then be utilized to select documents in the document corpus 102A as candidate duplicate documents of the document. In this way, a list 116 of candidate duplicate documents can be created. The list 116 of candidate duplicate documents might then be provided to a duplicate identification service 118 for detection of the documents in the document corpus 102A that are actual duplicates of the document. The list 116 of candidate duplicate documents might also be utilized in other ways in other configurations. Additional details regarding the mechanism described above for mapping a document to candidate duplicate documents in a document corpus 102A will be provided below with regard to FIG. 2.

It should be appreciated that the configuration shown in FIG. 1 is merely illustrative and that other configurations might be utilized. For example, and without limitation, although a single document corpus 102B is illustrated in FIG. 1, it should be appreciated that the technologies disclosed herein might be utilized with multiple such document corpora. Additionally, although not illustrated in FIG. 1, it should also be appreciated that the inverted index creation service 110 might be utilized to create a bitset optimized inverted index for the document corpus 102B in a similar manner to that described above. Other configurations will be apparent to those skilled in the art.

Figure 2:
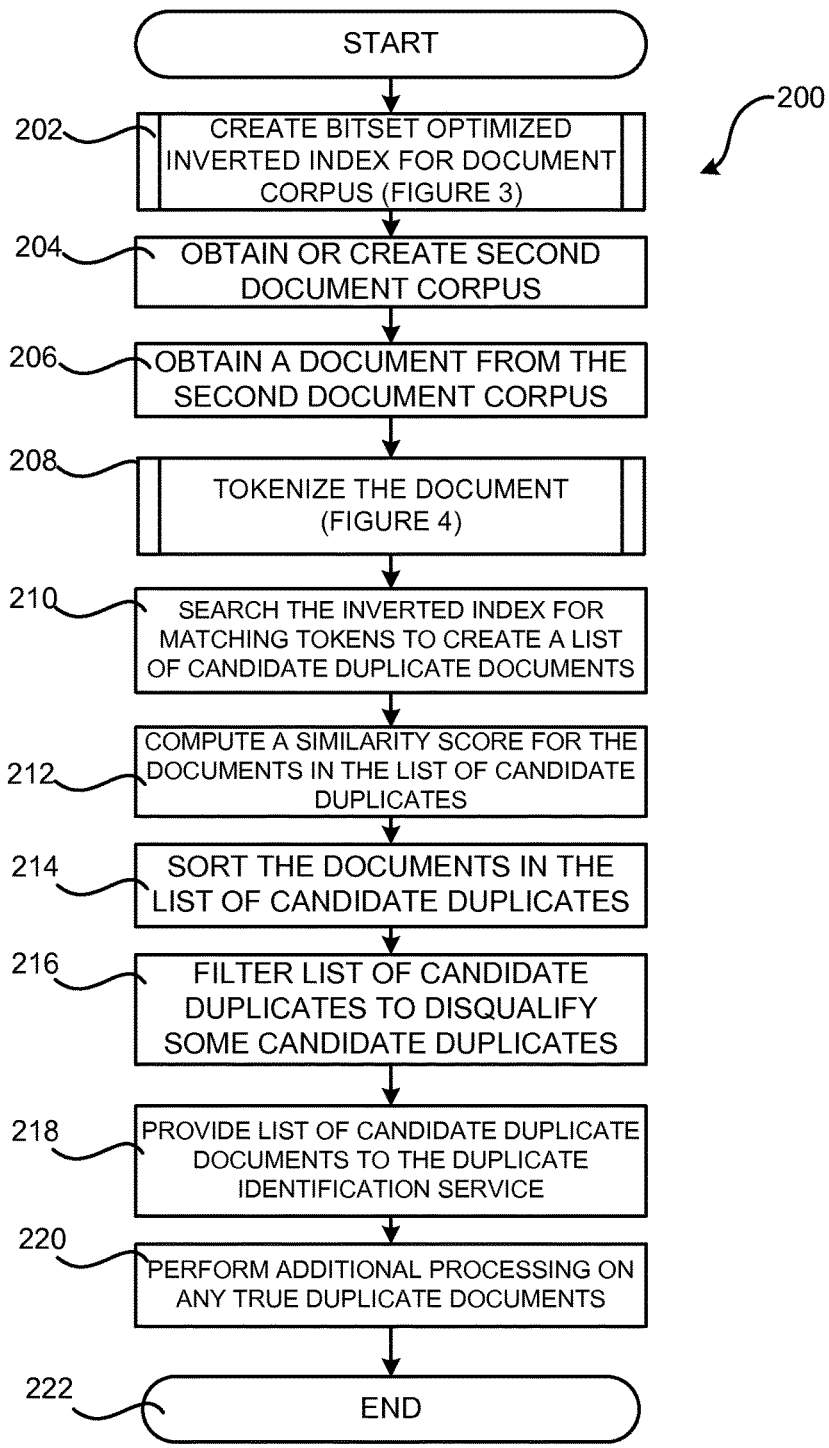
FIG. 2 is a flow diagram illustrating aspects of a routine disclosed herein for mapping documents in a first document corpus to candidate duplicate documents in a second document corpus.

FIG. 2 is a flow diagram illustrating aspects of a routine 200 disclosed herein for mapping documents in one document corpus, such as the document corpus 102B, to candidate duplicate documents contained in a second document corpus, such as the document corpus 102A. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where the inverted index creation service 110 creates a bitset optimized inverted index 112 for the document corpus that is to be examined for duplicates (e.g. the document corpus 102A in this example). Details regarding the creation of the bitset optimized inverted index 112 are provided below with regard to FIGS. 3 and 4.

From operation 202, the routine 200 proceeds to operation 204, where the corpus generation service 104 searches the document sources 106 for documents of interest. As discussed briefly above, the documents obtained from the document sources 106 are product records in one particular configuration. Other types of documents might also be obtained from the document sources 106 in other configurations.

From operation 204, the routine 200 proceeds to operation 206, where a document is obtained from the document corpus 102B for which duplicates are to be identified in the document corpus 102A. In the example shown in FIG. 1 and described herein in more detail with regard to FIG. 2, the document corpus 102A is examined to identify documents contained therein that are duplicates of documents in the document corpus 102B. It should be appreciated, however, that this mechanism might be utilized to identify duplicate documents in the document corpus 102A itself, duplicate documents in the document corpus 102B itself (or any other document corpus), or duplicates of a document not contained in any document corpus (e.g. a document received from an external vendor for inclusion in a document corpus). The mechanism described with reference to FIG. 2 might also be utilized in other situations.

From operation 206, the routine 200 proceeds to operation 208, where the document received at operation 206 is tokenized. As described briefly above, adaptive tokenization may be utilized to tokenize the document in some configurations. One mechanism for adaptive tokenization of a document will be described below with regard to FIG. 4. It should be appreciated that other mechanisms might be utilized to tokenize a document for which duplicates are to be identified in a document corpus.

From operation 208, the routine 200 proceeds to operation 210, where the inverted index creation service 110 searches the bitset optimized inverted index 112 for the tokens extracted from the document at operation 208. If a token from the document is found in the bitset optimized inverted index 112, the bits from the bitset associated with the found token are utilized to identify the documents in the document corpus 102A containing the matching token. These documents are then added to the list 116 of candidate duplicate documents. This process may be repeated for all of the tokens extracted from the document for which duplicates are to be identified at operation 208.

From operation 210, the routine 200 proceeds to operation 212, where a similarity score may be computed for the documents in the list 116 of candidate documents in some configurations. For example, in some configurations, a Jaccard similarity coefficient may be computed for the documents in the list 116 of candidate duplicate documents. Other types of similarity scores might be computed for the documents in the list 116 of candidate duplicate documents in other configurations.

From operation 212, the routine 200 proceeds to operation 214, where the documents in the list 116 of candidate duplicate documents might be sorted based upon the similarity score computed at operation 212. The routine 200 may then proceed to operation 216, where the list 116 of documents might be filtered based upon the computed similarity score or other consideration. For example, and without limitation, documents in the list 116 of candidate duplicate documents having a similarity score below a certain threshold might be removed from the list 116 of candidate duplicate documents. Other mechanisms might also be utilized to filter documents from the list 116 of candidate duplicate documents.

Once the list 116 of candidate duplicate documents has been scored and filter, the list 116 of candidate duplicate documents might be provided to a duplicate identification service 118 in some configurations. In this regard, it should be appreciated that the documents identified in the list 116 of candidate duplicate documents are not necessarily actual duplicates of documents in the document corpus 102A. Accordingly, the duplicate identification service 118 might perform additional processing, such as detailed pattern matching and/or machine learning, to identify those documents in the list 116 of candidate duplicate documents that are true duplicates of documents stored in the document corpus 102A.

Once any actual duplicate documents have been identified, additional processing might be performed on the duplicates. For example, and without limitation, if a document in the document corpus 102A is determined to be a duplicate of one or more documents in the document corpus 102B, the document might be added to a competitive monitoring system, whereby a price charged for the item by the merchant that maintains the document corpus 102A might be matched to the price for the item listed by the document source 106 from which the document was obtained. Changes in the price for the item might also be detected over time. In this way, the merchant that maintains the document corpus 102A might match or even beat the price at which the item is offered by another merchant. Other types of processing not specifically identified herein might also be performed for documents in the document corpus 102B that are determined to be duplicates of documents in the document corpus 102A.

Processing might also be performed for documents in the document corpus 102B that are determined not to be duplicates of documents in the document corpus 102A. For example, and without limitation, an "item addition" workflow might be initiated by which the item identified by the document may be added to the document corpus 102A. Other types of processing not specifically identified herein might also be performed for documents in the document corpus 102B that are determined not to be duplicates of documents in the document corpus 102A. From operation 220, the routine 200 proceeds to operation 222, where it ends.

Figure 3:
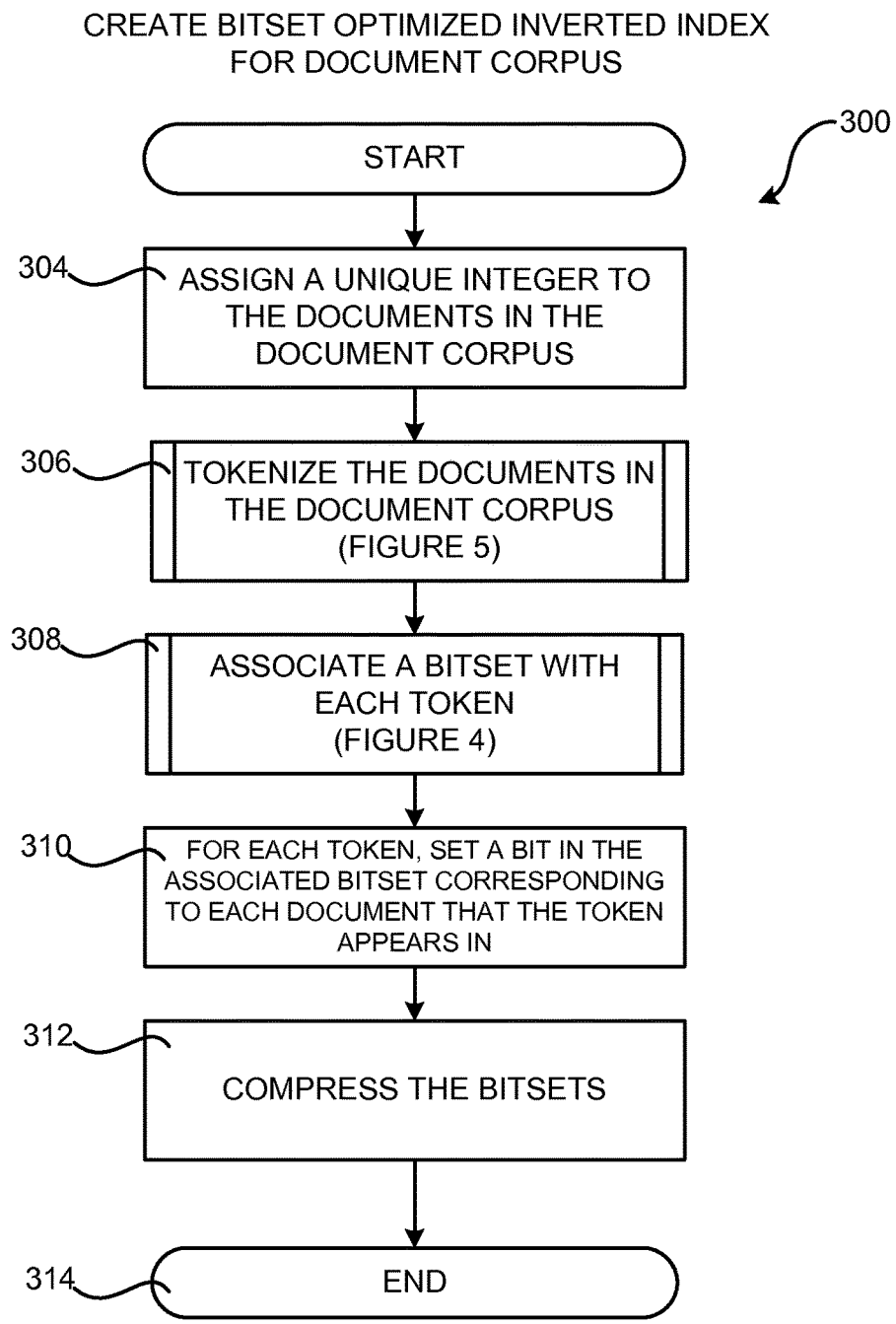
FIG. 3 is a flow diagram illustrating aspects of a routine disclosed herein for creating a bitset optimized inverted index for a document corpus.

FIG. 3 is a flow diagram illustrating aspects of a routine 300 disclosed herein for creating a bitset optimized inverted index 112 for a document corpus 102A. The routine 300 begins at operation 304, where a unique integer (which might be referred to below as a document ("ID") is assigned to each of the documents in the document corpus 102A. A data structure might be maintained in memory on or disk that indicates the unique integer assigned to the documents. Once a unique integer has been assigned to the documents in the document corpus 102A, the routine 300 proceeds from operation 304 to operation 306, where the documents in the document corpus 102A are tokenized. As discussed above, adaptive tokenization is utilized in some configurations. One method for adaptive tokenization of the documents in the document corpus 102A will be described in detail below with regard to FIG. 5.

Figure 4:
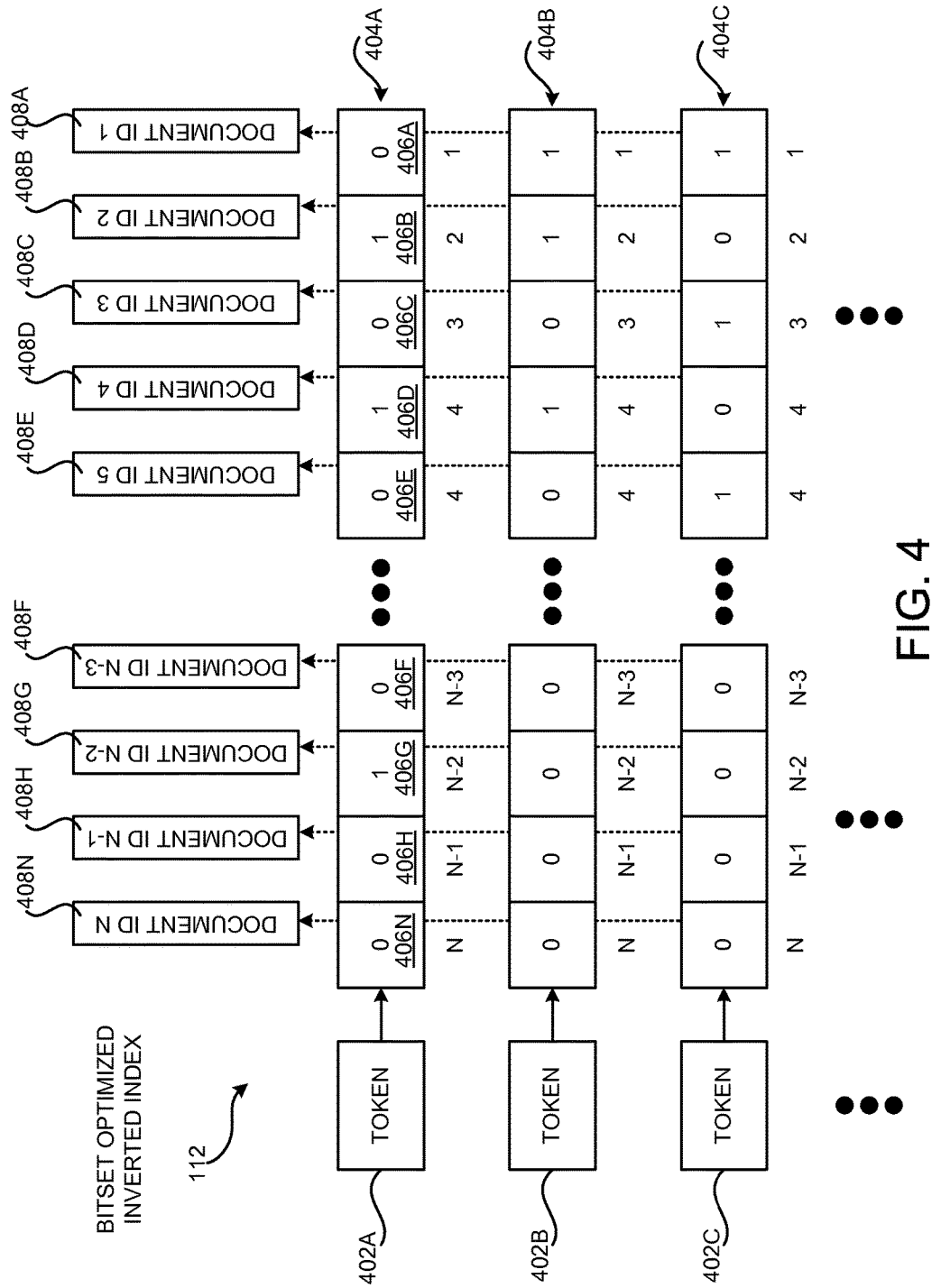
FIG. 4 is a data structure diagram illustrating aspects of the format and utilization of a bitset optimized inverted index in one configuration disclosed herein.

From operation 306, the routine 300 proceeds to operation 308, where a bitset is created and associated with each of the tokens generated at operation 306. Turning briefly to FIG. 4, a data structure diagram illustrating aspects of the format and utilization of the bitset optimized inverted index 112 will be described in order to illustrate more fully the creation and use of the bitsets. As shown in FIG. 4, the bitset optimized inverted index 112 includes the tokens 402 that were generated at operation 306. A bitset 404 is then created and associated with each of the tokens. For instance, in the example shown in FIG. 4, the bitset 404A is associated with the token 402A, the bitset 404B is associated with the token 402B, and the bitset 404C is associated with the token 402C.

Each of the bitsets 404 includes a number of bits equivalent to the number of documents in the document corpus 102A. In the example shown in FIG. 4, for instance, there are N documents in the document corpus 102A and, accordingly, the bitsets include N bits 406A-406N. Each of the bits 406A-406N is associated with a unique document ID 408 for a document in the document corpus 102A. For instance, in the example shown in FIG. 4, the bit 406A is associated with the document ID 408A, the bit 406B is associated with the document ID 408B, the bit 406C is associated with the document ID 408C, and so on.

During the creation of the bitset optimized inverted index 112, the bits 406 in the bitsets 404 are set when the associated token 402 is found in the corresponding document. For instance, in the example shown in FIG. 4, the bits 406B, 406D and 406G of the bitset 404A have been set to indicate that the token 402A is found in the documents associated with the documents IDs 408B, 408D, and 408G. Similarly, the bits 406A, 406B and 408D of the bitset 404B have been set to indicate that the token 402B is found in the documents associated with the documents IDs 408A, 408B, and 408D. Likewise, the bits 406A, 406C and 406E of the bitset 404C have been set to indicate that the token 402C is found in the documents associated with the documents IDs 408A, 408C, and 408E.

Although three bitsets 404A-C corresponding to three tokens 402A-402C have been shown in FIG. 4, it should be appreciated that bitsets 404 may be utilized for all of the tokens found in the documents in the document corpus 102A. Additionally, it should also be appreciated that although the binary digit '1' is shown in FIG. 4 as indicating the presence of a token 402 in a document and the binary digit '0' is utilized to indicate the absence of a token 402 in a document, the opposite configuration might be utilized in other configurations.

Returning now to FIG. 3, a bit 406 is set in the associated bitset corresponding to each document that a token 402 appears in the manner described above. Once all of the bits 406 in the bitsets 404 have been set, the routine 300 proceeds to operation 312 where the bitsets 404 are compressed utilizing an appropriate compression algorithm. Because the bitsets 404 tend to be sparse, a high level of data compression may be realized. This allows the bitset optimized inverted index 112 to be maintained in a main memory of a computer even when the document corpus 102A contains hundreds of millions, or even potentially billions of documents. From operation 312, the routine 300 proceed to operation 314, where it ends.

Figure 5:
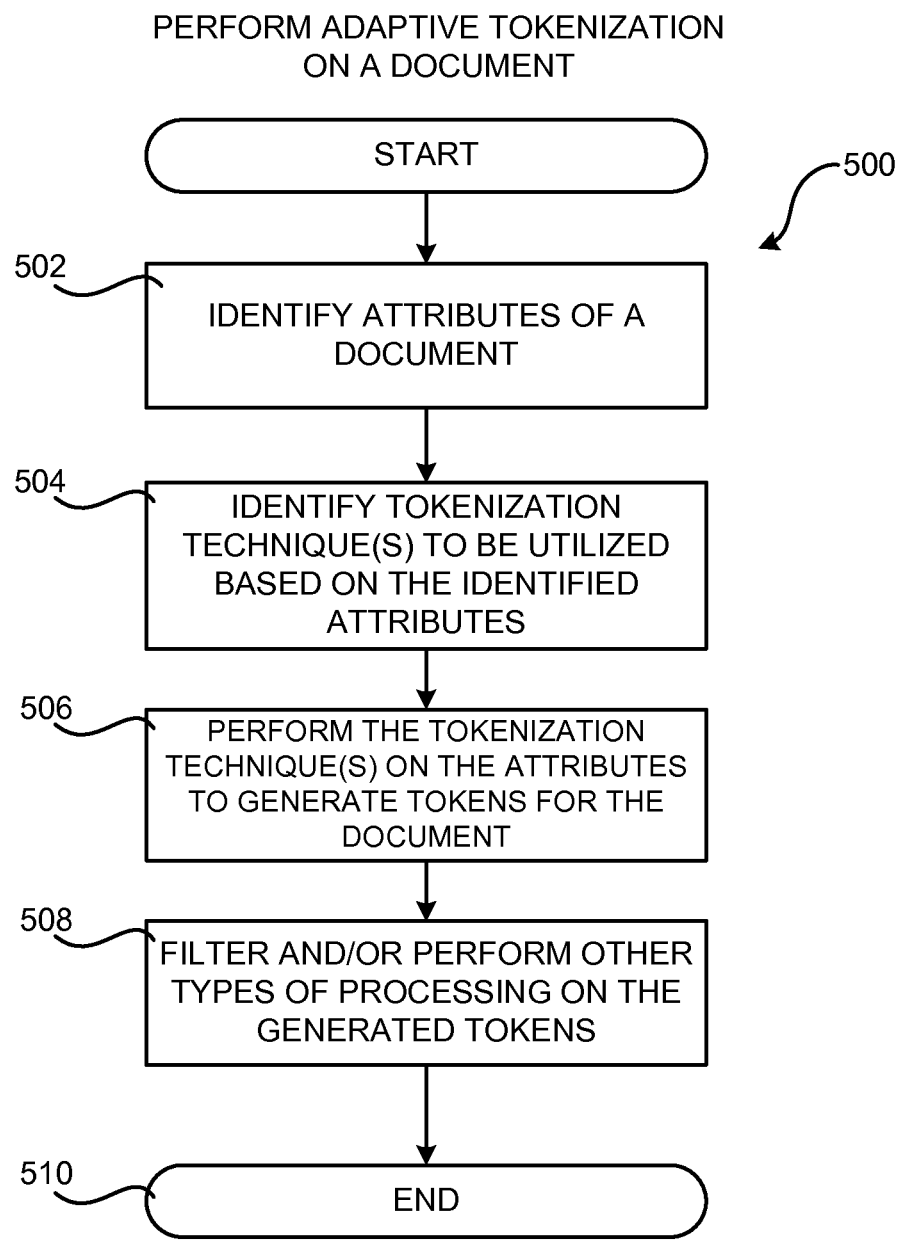
FIG. 5 is a flow diagram illustrating aspects of routine disclosed herein for performing adaptive tokenization of a document, such as a document in a document corpus.

FIG. 5 is a flow diagram illustrating aspects of routine 500 disclosed herein for performing adaptive tokenization of a document, such as a document in a document corpus 102A. As discussed briefly above, adaptive tokenization refers to a process by which one or more tokenization techniques might be selected and utilized based upon various attributes of the document. For example, an orthogonal space bigram tokenization technique and/or an n-gram tokenization technique might be selected for tokenizing certain attributes of a document based upon the content of those attributes. Other tokenization techniques might also be selected and utilized on a per attribute basis. Additional details regarding this process are provided below.

The routine 500 begins at operation 502, where the attributes of a document to be tokenized are identified. As discussed briefly above, a document to be tokenized, such as documents in the document corpus 102A or the document corpus 102B, may include semi-structured data corresponding to various attributes. When a document is a product record, for example, the document might include a "name" attribute storing data that defines a name of a product. A document might similarly include a "description" attribute storing a textual description of a product. Documents might also include other attributes that are identified at operation 502.

From operation 502, the routine 500 proceeds to operation 504, where one or more tokenization techniques are selected for each of the attributes identified at operation 502. The tokenization techniques are selected based upon the nature of the data stored in each attribute. For example, and without limitation, an orthogonal space bigram tokenization technique might be selected for document attributes that are not well formed sentences, such as an item name in the case of a product record. A tokenization technique in which the attribute name is concatenated with tokens of the attribute might also be utilized for certain types of attributes like part numbers, model numbers, and the like. For example, a token "partnumber_123456" might be created for an attribute called "partnumber" containing the data "123456." For attributes that include terms that are commonly utilized together, a tokenization technique might be selected by which all of the terms for the attribute are combined to form a single token. Other tokenization techniques might also be selected based upon the content of the attributes of the document including, but not limited to, an n-gram tokenization technique, a tri-gram tokenization technique and others.

In some configurations, an entity identification tokenization technique might also be utilized. This technique takes into account the context that particular tokens appear in. For example, and without limitation, the phrases "Calvin Klein" and "Calvin and Hobbes" are far more meaningful when they are treated as a single token rather than being tokenized as separate words. Tokenizing based on entities, therefore, has the potential to improve the performance of the mechanisms described herein.

In one particular implementation of an entity identification technique, phrases that correspond to known entities are first identified. Various mechanisms may be utilized to identified entities including, but not limited to, utilizing user-supplied search phrases supplied to a search engine to identify the phrases. Other mechanisms might also be utilized. Once the phrases have been identified, these phrases can be tokenized together rather than being tokenized separately. In this way, the additional meaning conferred by the collection of terms may be retained during the tokenization process.

From operation 504, the routine 500 proceeds to operation 506, where the tokenization techniques selected at operation 504 are utilized to tokenize the various attributes of the document. As discussed above, more than one tokenization technique might be utilized on each attribute of the document. Once the document has been tokenized, the routine 400 proceeds to operation 508.

At operation 508, the tokens might be filtered to remove stop or noise words. Special punctuation and/or special characters might also be removed from the tokens. Other types of processing might also be performed on the tokens, such as stemming and/or the merging of tokens. The routine 500 then proceeds to operation 510, where it ends.

Figure 6:
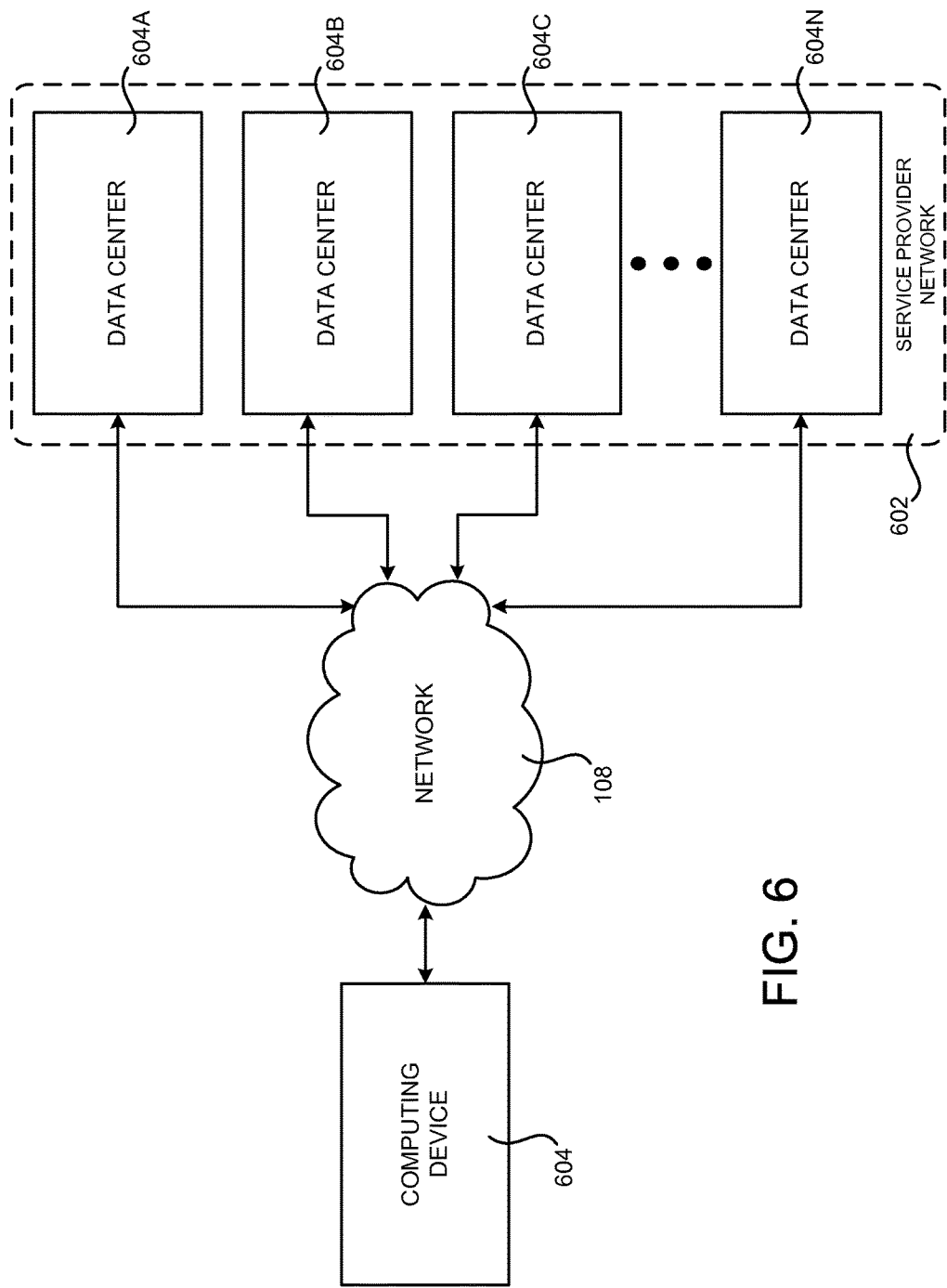
FIG. 6 is a system and network diagram that shows an illustrative operating environment that includes a service provider network that may be configured to implement aspects of the functionality described herein.

FIG. 6 is a system and network diagram that shows one illustrative operating environment for the configurations disclosed herein that includes a service provider network 602 that may be configured to map documents to candidate duplicate documents in a document corpus 102A in the manner described above, according to one configuration disclosed herein.

The service provider network 602 can provide computing resources on a permanent or an as-needed basis. Among other types of functionality, the computing resources provided by the service provider network 602 can be utilized to execute the various services described above. The computing resources provided by the service provider network 602 may include various types of computing resources, such as data processing resources, data storage resources, networking resources, data communication resources, and the like. Each type of computing resource may be general-purpose or may be available in a number of specific configurations. For example, data processing resources may be available as physical computers or virtual machine instances in a number of different configurations. The virtual machine instances may be configured to execute applications, including Web servers, application servers, media servers, database servers, some or all of the services described above, and other types of programs. Data storage resources may include file storage devices, block storage devices, and the like, and may be utilized to store data, such as the document corpus 102A and the document corpus 102B. The service provider network 602 might also be configured to provide other types of resources and network services.

The computing resources provided by the service provider network 602 are enabled in one implementation by one or more data centers 604A-604N (which may be referred herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 might also be located in geographically disparate locations. One illustrative configuration for a data center 604 that implements some of the technologies disclosed herein for mapping documents to candidate duplicate documents in a document corpus 102A will be described below with regard to FIG. 7.

The customers and other users of the service provider network 602 may access the computing resources provided by the service provider network 602 over a network 108, such as a wide area network ("WAN") like the Internet. For example, and without limitation, a computing device 604 operated by a customer or other user of the service provider network 602 might be utilized to access the service provider network 602 by way of the network 108. It should be appreciated that a local-area network ("LAN"), the Internet, or any other networking topology known in the art that connects the data centers 604 to remote customers and other users may be utilized. It should also be appreciated that combinations of such networks might also be utilized.

Figure 7:
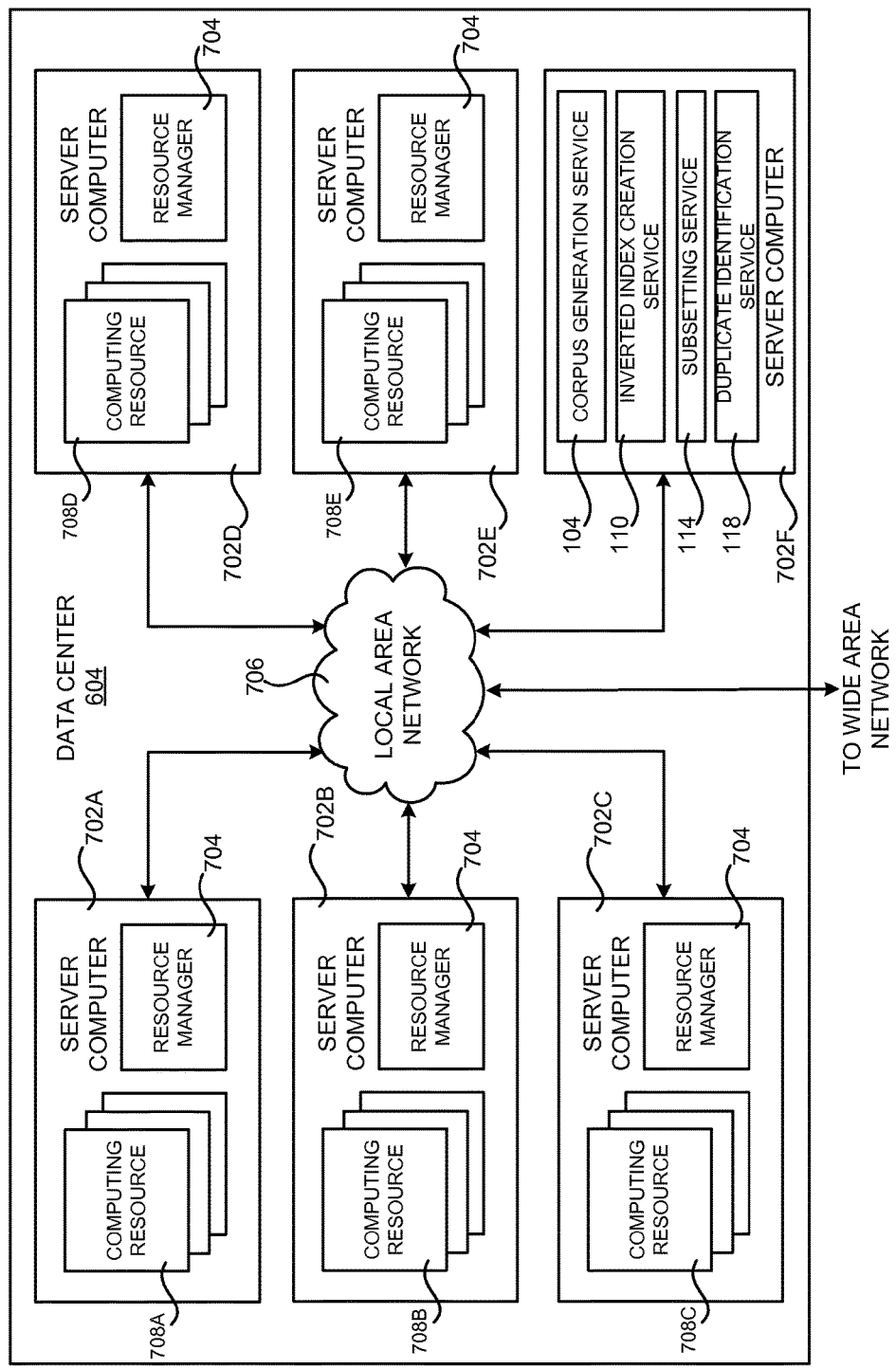
FIG. 7 is a computing system diagram that illustrates a configuration for a data center that may be utilized to implement aspects of the technologies disclosed herein.

FIG. 7 is a computing system diagram that illustrates one configuration for a data center 604 that implements aspects of the concepts and technologies disclosed herein for mapping documents to candidate duplicates in a document corpus 102A, according to one configuration disclosed herein. The example data center 604 shown in FIG. 7 includes several server computers 702A-702F (which may be referred to herein singularly as "a server computer 702" or in the plural as "the server computers 702") for providing computing resources 708A-708E.

The server computers 702 may be standard tower, rackmount, or blade server computers configured appropriately for providing the computing resources described herein. As mentioned above, the computing resources might be data processing resources such as virtual machine instances or hardware computing systems, data storage resources, database resources, networking resources, and others. Some of the servers 702 might also be configured to execute a resource manager 704 capable of instantiating and/or managing the computing resources. In the case of virtual machine instances, for example, the resource manager 704 might be a hypervisor or another type of program configured to enable the execution of multiple virtual machine instances on a single server 702. Server computers 702 in the data center 704 might also be configured to provide network services and other types of services, some of which are described in detail below with regard to FIG. 8.

The data center 604 shown in FIG. 7 also includes a server computer 702F that may execute some or all of the software components described above. For example, and without limitation, the server computer 702F might be configured to execute the corpus generation service 104, the inverted index creation service 110, the subsetting service 114, and/or the duplicate identification service 118, each of which has been described in detail above. The server computer 702F might also be configured to execute other components and/or to store data for providing some or all of the functionality described herein. In this regard, it should be appreciated that the services illustrated in FIG. 7 as executing on the server computer 702F might execute on many other physical or virtual servers in the data centers 604 in various configurations.

In the example data center 604 shown in FIG. 7, an appropriate LAN 706 is also utilized to interconnect the server computers 702A-702F. The LAN 706 is also connected to the network 108 illustrated in FIG. 6. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 604A-604N, between each of the server computers 702A-702F in each data center 604, and, potentially, between computing resources in each of the data centers 604. It should be appreciated that the configuration of the data center 604 described with reference to FIG. 7 is merely illustrative and that other implementations might be utilized.

Figure 8:
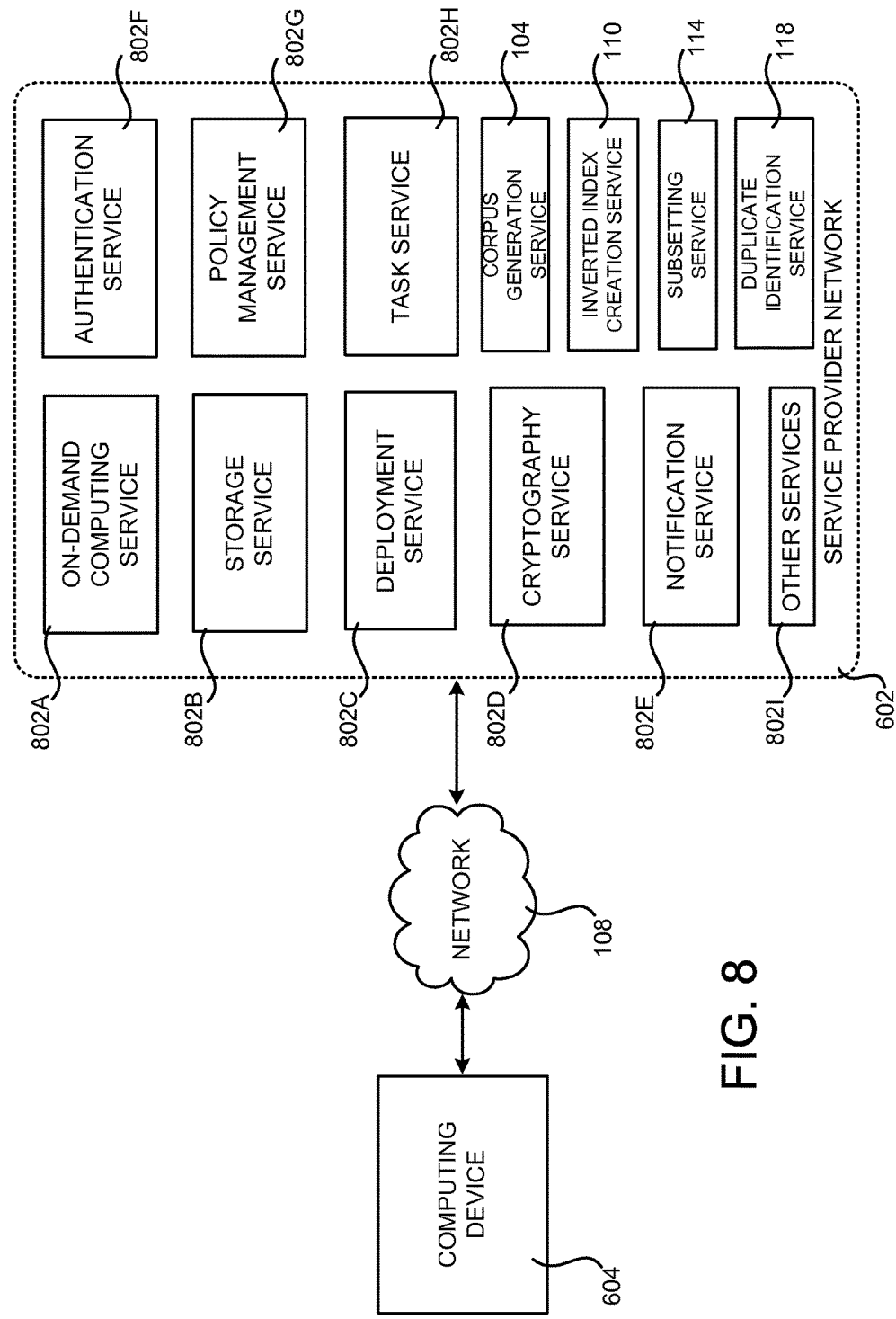
FIG. 8 is a system and network diagram that shows aspects of several services that might be provided by and utilized within a service provider network in one configuration disclosed herein.

FIG. 8 is a system and network diagram that shows aspects of several network services that might be provided by and utilized within a service provider network 602 in one configuration disclosed herein. In particular, and as discussed briefly above, the service provider network 602 may provide a variety of network services to customers and other users of the service provider network 602 including, but not limited to, an on-demand computing service 802A, a storage service 802B, a deployment service 802C, a cryptography service 802D, a notification service 802E, an authentication service 802F, a policy management service 802G, and/or a task service 802H, each of which is described in greater detail below. Additionally, the service provider network 602 might also provide the corpus generation service 104, the inverted index creation service 110, the subsetting service 114, and/or the duplicate identification service 118, each of which was described in detail above. The service provider network 102 might also provide other services 802I, some of which are described in greater detail below.

It should be appreciated that customers of the service provider network 602 may include organizations or individuals that utilize some or all of the services provided by the service provider network 602. As shown in FIG. 8, a customer or other user may communicate with the service provider network 602 through a network 108, which may be a communication network, such as the Internet, an intranet or an Internet service provider ("ISP") network or a combination of such networks. Communications from the computing device 604 to the service provider network 602 may cause the services provided by the service provider network 602 to operate in accordance with the described configurations or variations thereof.

It is noted that not all configurations described include the services described with reference to FIG. 8 and that additional services may be provided in addition to or as an alternative to services explicitly described. Each of the services shown in FIG. 8 might also expose web service interfaces that enable a caller to submit appropriately configured API calls to the various services through web service requests. In addition, each of the services may include service interfaces that enable the services to access each other (e.g., to enable a virtual computer system provided by the on-demand computing service 802A to store data in or retrieve data from the data storage service 802B). Additional details regarding some of the services shown in FIG. 8 will now be provided.

The on-demand computing service 802A may be a collection of computing resources configured to instantiate virtual machine instances. For example, a customer or other user of the service provider network 602 may interact with the on-demand computing service 802A (via appropriately configured and authenticated API calls) to provision and operate virtual computer systems that are instantiated on physical computing devices hosted and operated by the service provider network 602. The virtual computer systems may be used for various purposes, such as to operate as servers supporting a website, to operate business applications or, generally, to serve as computing resources for the customer. Other applications for the virtual computer systems may be to support database applications, electronic commerce applications, business applications and/or other applications. Although the on-demand computing service 802A is shown in FIG. 8, any other computer system or computer system service may be utilized in the service provider network 602, such as a computer system or computer system service that does not employ virtualization and instead provisions computing resources on dedicated or shared computers/servers and/or other physical devices.

In some configurations, the on-demand computing service 802A is configured to provide clusters of computing resources. For example, and without limitation, the on-demand computing service 802A might provide clusters of virtual or physical hosts for executing services such as those described above. According to one configuration, computing clusters provided by the on-demand computing service 802A be organized as an APACHE™ HADOOP® computing cluster specialized for deployment alongside, or within, the service provider network 602. It should be appreciated that other variations and implementations of computing clusters are possible. Thus, the present disclosure should not be limited to only these examples, but should be interpreted as including any equivalent variations as well.

The computing clusters provided by the on-demand computing service 802A may be utilized to execute software services that benefit from distributed execution on a potentially large number of hosts. For example, and without limitation, some or all of the corpus generation service 104, the inverted index creation service 110, the subsetting service 114, and/or the duplicate identification service 118 might be executed on computing clusters provided by the on-demand computing service 802A.

The storage service 802B might include software and computing resources that collectively operate to store data using block or file-level storage devices (and/or virtualizations thereof). The storage devices of the storage service 802B might, for instance, be operationally attached to virtual computer systems provided by the on-demand computing service 802A to serve as logical units (e.g., virtual drives) for the computer systems. A storage device might also enable the persistent storage of data used/generated by a corresponding virtual computer system where the virtual computer system service might only provide ephemeral data storage.

The service provider network 602 may also include a cryptography service 802D. The cryptography service 802D may utilize storage services of the service provider network 602, such as the storage service 802B, to store encryption keys in encrypted form, whereby the keys may be usable to decrypt customer keys accessible only to particular devices of the cryptography service 802D. The cryptography service 802D might also provide other types of functionality not specifically mentioned herein.

The service provider network 602 might also provide a notification service 802E in some configurations. The notification service 802E may comprise a collection of computing resources collectively configured to provide a web service or other interface and a browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol ("HTTP"), e-mail and short message service ("SMS"), among others). The notification service 802E might also provide notifications to clients using a "push" mechanism without the need to periodically check or "poll" for new information and updates. The notification service 802E may further be used for various purposes such as monitoring applications executing in the on-demand computing service 802A, workflow systems, time-sensitive information updates, mobile applications, and many others.

As illustrated in FIG. 8, the service provider network 602, in various configurations, also includes an authentication service 802F and a policy management service 802G. The authentication service 802F, in one example, is a computer system (i.e., collection of computing resources) configured to perform operations involved in authentication of users. For instance, one of the services shown in FIG. 8 may provide information from a user to the authentication service 802F to receive information in return that indicates whether or not the requests submitted by the user are authentic.

The policy management service 802G, in one example, is a computer system configured to manage policies on behalf of customers or internal users of the service provider network 602. The policy management service 802G may include an interface that enables customers to submit requests related to the management of policy. Such requests may, for instance, be requests to add, delete, change or otherwise modify policy for a customer, service, or system, or for other administrative actions, such as providing an inventory of existing policies and the like.

The service provider network 602, in various configurations, is also configured with a task service 802H. The task service 802H is configured to receive a task package and to enable executing tasks as dictated by the task package. The task service 802H may be configured to use any resource of the service provider network 602, such as instantiated virtual machines or virtual hosts, for executing the task. The task service 802H may configure the instantiated virtual machines or virtual hosts to operate using a selected operating system and/or a selected execution application in accordance with specified requirements.

The service provider network 602 may additionally maintain other services 802 based, at least in part, on the needs of its customers. For instance, the service provider network 602 may maintain a deployment service 802C for deploying program code and/or a database service (not shown in FIG. 8) in some configurations. A database service may be a collection of computing resources that collectively operate to create, maintain, and allow queries to be performed on databases stored within the service provider network 602. For example, a customer or other user of the service provider network 602 may operate and manage a database from the database service by utilizing appropriately configured network API calls. This, in turn, may allow the customer to maintain and potentially scale the operations in the database. Other services include object-level archival data storage services, and services that manage and/or monitor other services. The service provider network 602 might also be configured with other services not specifically mentioned herein in other configurations.

It should be appreciated that various mechanisms might be implemented in order to measure the recall rate of the mechanism described above. For example, and without limitation, audit data that includes documents identified as true duplicates might be utilized to compute a recall rate that measures the efficiency of the system described above. Other mechanisms might also be utilized.

Figure 9:
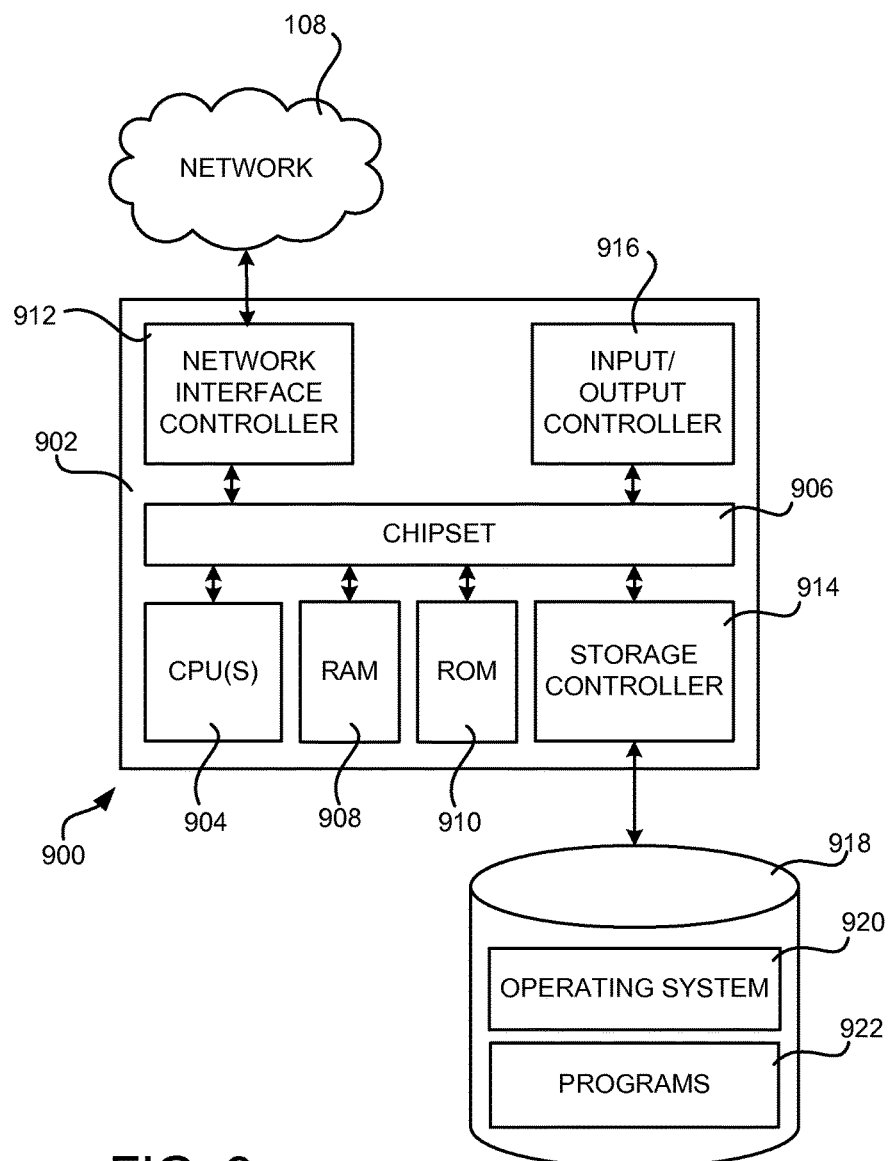
FIG. 9 is a computer architecture diagram showing an illustrative computer hardware architecture for implementing a computing device that might be utilized to implement aspects of the various technologies presented herein.

FIG. 9 shows an example computer architecture for a computer 900 capable of executing program components for implementing various aspects of the functionality described above. The computer architecture shown in FIG. 9 illustrates a conventional server computer, workstation, desktop computer, laptop, tablet, network appliance, e-reader, smartphone, or other computing device, and may be utilized to execute any of the software components presented herein. For example, the computer architecture shown in FIG. 9 may be utilized to execute software components for providing the corpus generation service 104, the inverted index creation service 110, the subsetting service 114, the duplicate identification service 118, and/or related functionality.

The computer 900 includes a baseboard 902, or "motherboard," which is a printed circuit board to which a multitude of components or devices may be connected by way of a system bus or other electrical communication paths. In one illustrative configuration, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the configurations described herein.

The computer 900 may operate in a networked environment using logical connections to remote computing devices and computer systems through a network, such as the network 108. The chipset 906 may include functionality for providing network connectivity through a NIC 912, such as a gigabit Ethernet adapter. The NIC 912 is capable of connecting the computer 900 to other computing devices over the network 108. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store an operating system 920, programs 922, and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage, and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 may store an operating system 920 utilized to control the operation of the computer 900. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 918 may store other system or application programs and data utilized by the computer 900.

In one configuration, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various routines described above with regard to FIGS. 2-5. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, an input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

The disclosure presented herein also encompasses the subject matter set forth in the following clauses:

Clause 1. An apparatus for identifying candidate duplicate documents of a document contained in a document corpus, the apparatus comprising: a processor; and a non-transitory computer-readable storage medium having instructions stored thereupon which are executable by the processor and which, when executed, cause the apparatus to create a bitset optimized inverted index comprising bitsets associated with tokens contained in documents in the document corpus, wherein each bitset comprises a number of binary digits equivalent to the number of documents in the document corpus, and wherein each binary digit in each bitset corresponds to a different document in the document corpus, receive a request to identify the candidate duplicate documents of the document contained in the document corpus, tokenize the document to identify tokens in the document, search the tokens contained in the documents in the document corpus to identify tokens that are in the document and also in at least one document in the document corpus, and utilize the bitsets associated with the identified tokens to select documents in the document corpus as the candidate duplicate documents of the document.

Clause 2. The apparatus of clause 1, wherein the tokens contained in the documents in the document corpus are identified through adaptive tokenization of the documents in the document corpus.

Clause 3. The apparatus of clauses 1 and 2, wherein the documents in the document corpus comprise one or more attributes, and wherein adaptive tokenization comprises: selecting one or more tokenization techniques based upon the attributes; and applying the selected tokenization techniques to the attributes of the documents to identify the tokens contained in the documents.

Clause 4. The apparatus of clauses 1-3, wherein the document for which candidate duplicate documents in the document corpus are identified is contained in a second document corpus.

Clause 5. The apparatus of clauses 1-4, wherein the second document corpus comprises a corpus of documents obtained from a plurality of document sources on a distributed network.

Clause 6. The apparatus of clauses 1-5, wherein the documents in the document corpus and the documents in the second document corpus comprise product records.

Clause 7. A non-transitory computer-readable storage medium having computer-executable instructions stored thereupon which, when executed by a computer, cause the computer to: tokenize the documents in a document corpus to identify tokens contained in the documents in the document corpus; maintain a bitset associated with each of the tokens in a memory of the computer, wherein each bitset comprises a number of binary digits equivalent to the number of documents in the document corpus, and wherein each binary digit in each bitset corresponds to a unique document in the document corpus; for each binary digit in each bitset, determine if the token associated with the bitset is contained in the document in the document corpus corresponding to the binary digit, and set the binary digit if the token associated with the bitset appears in the document in the document corpus corresponding to the binary digit; and compress the bitsets in the memory of the computer.

Clause 8. The non-transitory computer-readable storage medium of clause 7, having further computer-readable instructions stored thereupon to: receive a request to identify one or more candidate duplicate documents of a document contained in the document corpus; tokenize the document to identify tokens in the document; search the tokens contained in the documents in the document corpus to identify tokens that are in the document and also in at least one document in the document corpus; and utilize the bitsets associated with the identified tokens to select documents in the document corpus as candidate duplicate documents of the document.

Clause 9. The non-transitory computer-readable storage medium of clause 7 and 8, wherein the document for which the candidate duplicate documents are identified is contained in a second document corpus.

Clause 10. The non-transitory computer-readable storage medium of clauses 7-9, wherein the documents in the document corpus comprise one or more attributes, and wherein tokenize the documents in the document corpus to identify tokens contained in the documents comprises:

selecting one or more tokenization techniques based upon the attributes; and applying the selected tokenization techniques to the attributes of the documents to identify the tokens contained in the documents.

Clause 11. The non-transitory computer-readable storage medium of clauses 7-10, wherein at least one of the one or more tokenization techniques comprises an orthogonal space bigram tokenization technique.

Clause 12. The non-transitory computer-readable storage medium of clauses 7-11, wherein at least one of the one or more tokenization techniques comprises an n-gram tokenization technique.

Clause 13. The non-transitory computer-readable storage medium of clauses 7-12, wherein at least one of the one or more tokenization techniques is configured to include an attribute name in the tokens for an attribute.

Clause 14. The non-transitory computer-readable storage medium of clauses 7-13, wherein at least one of the one or more tokenization techniques is configured to generate a token for an attribute that includes all of the terms in the attribute.

Clause 15. The non-transitory computer-readable storage medium of clauses 7-14, wherein at least one of the one or more tokenization techniques utilizes entity identification.

Clause 16. A computer-implemented method for mapping a document to candidate duplicate documents in a document corpus, the method comprising: creating bitsets in a memory of a computer that are associated with tokens identified in documents in the document corpus, wherein the bitsets comprise a number of binary digits equivalent to the number of documents in the document corpus, and wherein the binary digits correspond to documents in the document corpus; for the binary digits in the bitsets, determining if the token associated with a bitset is contained in the document in the document corpus corresponding to a binary digit, and setting the binary digit if the token associated with the bitset is contained in the document in the document corpus corresponding to the binary digit; and compressing the bitsets in the memory of the computer.

Clause 17. The computer-implemented method of clause 16, further comprising: receiving a request to map the document to the candidate duplicate documents in the document corpus; tokenizing the document to identify tokens in the document; searching the tokens for the documents in the document corpus to identify tokens that are in the document and that are also in at least one document in the document corpus; and selecting documents in the document corpus as the candidate duplicate documents of the document using the bitsets.

Clause 18. The computer-implemented method of clauses 16 and 17, wherein the document is tokenized using adaptive tokenization, and wherein the tokens for the documents in the document corpus are generated using adaptive tokenization.

Clause 19. The computer-implemented method of clauses 16-18, wherein adaptive tokenization comprises: selecting one or more tokenization techniques based upon attributes of a document; and applying the selected tokenization techniques to the attributes of the document to identify the tokens contained in the document.

Clause 20. The computer-implemented method of clauses 16-19, wherein the document that is mapped to candidate duplicate documents in the document corpus is contained in a second document corpus.

Clause 21. An apparatus for identifying candidate duplicate documents of a document contained in a document corpus, the apparatus comprising: a processor; and a non-transitory computer-readable storage medium having instructions stored thereupon which are executable by the processor and which, when executed, cause the apparatus to utilize adaptive tokenization to generate tokens for documents in the document corpus, create an inverted index for the documents in the document corpus using the generated tokens, receive a request to map the document to candidate duplicate documents in the document corpus, utilize adaptive tokenization to generate tokens for the document, and identify the candidate duplicate documents in the document corpus by searching the inverted index to identify tokens that are in the document and that are also in at least one document in the document corpus.

Clause 22. The apparatus of clause 21, wherein adaptive tokenization comprises: selecting one or more tokenization techniques based upon the attributes of a document; and applying the selected one or more tokenization techniques to the attributes of the document.

Clause 23. The apparatus of clauses 21 and 22, wherein at least one of the one or more tokenization techniques comprises an orthogonal space bigram tokenization technique.

Clause 24. The apparatus of clauses 21-23, wherein at least one of the one or more tokenization techniques comprises an n-gram tokenization technique.

Clause 25. The apparatus of clauses 21-24, wherein at least one of the one or more tokenization techniques is configured to include an attribute name in the tokens for an attribute.

Clause 26. The apparatus of clauses 21-25, wherein at least one of the one or more tokenization techniques is configured to generate a token for an attribute that includes all of the terms in the attribute.

Clause 27. The apparatus of clauses 21-26, wherein at least one of the one or more tokenization techniques utilizes entity identification.

Clause 28. A non-transitory computer-readable storage medium having computer-executable instructions stored thereupon which, when executed by a computer, cause the computer to: receive a request to identify one or more candidate duplicate documents of a document in a document corpus; utilize adaptive tokenization to generate tokens for the document; and identify the candidate duplicate documents in the document corpus by searching an inverted index for the document corpus to identify tokens that are in the document and that are also in at least one document in the document corpus.

Clause 29. The non-transitory computer-readable storage medium of clause 28, wherein adaptive tokenization comprises: selecting one or more tokenization techniques based upon the attributes of a document; and applying the selected one or more tokenization techniques to the attributes of the document.

Clause 30. The non-transitory computer-readable storage medium of clauses 28 and 29, wherein the inverted index is generated, at least in part, by utilizing adaptive tokenization to generate tokens for documents in the document corpus, and creating the inverted index for the documents in the document corpus using the generated tokens.

Clause 31. The non-transitory computer-readable storage medium of clauses 28-30, wherein at least one of the one or more tokenization techniques comprises an orthogonal space bigram tokenization technique.

Clause 32. The non-transitory computer-readable storage medium of clauses 8-31, wherein at least one of the one or more tokenization techniques comprises an n-gram tokenization technique.

Clause 33. The non-transitory computer-readable storage medium of clauses 28-32, wherein at least one of the one or more tokenization techniques is configured to include an attribute name in the tokens for an attribute.

Clause 34. The non-transitory computer-readable storage medium of clauses 28-33, wherein at least one of the one or more tokenization techniques is configured to generate a token for an attribute that includes all of the terms in the attribute.

Clause 35. The non-transitory computer-readable storage medium of clauses 28-34, wherein at least one of the one or more tokenization techniques utilizes entity identification.

Clause 36. The non-transitory computer-readable storage medium of clauses 28-35, wherein the document for which candidate duplicate documents in the document corpus are identified is contained in a second document corpus.

Clause 37. A computer-implemented method for mapping a document to one or more candidate duplicate documents in a document corpus, the method comprising: receiving a request to identify the one or more candidate duplicate documents of the document in the document corpus; utilizing adaptive tokenization to generate tokens for the document; and identifying the one or more candidate duplicate documents in the document corpus by searching an inverted index generated from the document corpus to identify tokens that are found in the document and that are also found in at least one document in the document corpus.

Clause 38. The computer-implemented method of clause 37, wherein the inverted index is generated from the document corpus, at least in part, by utilizing adaptive tokenization to generate tokens for documents in the document corpus, and creating the inverted index for the documents in the document corpus using the generated tokens.

Clause 39. The computer-implemented method of clauses 37 and 38, wherein adaptive tokenization comprises: selecting one or more tokenization techniques based upon the attributes of a document; and applying the selected one or more tokenization techniques to the attributes of the document.

Clause 40. The computer-implemented method of clauses 37-39, wherein the inverted index comprises a bitset optimized inverted index.

Based on the foregoing, it should be appreciated that technologies for mapping documents to candidate duplicate documents in a document corpus 102A have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. An apparatus for identifying candidate duplicate documents of a document contained in a document corpus, the apparatus comprising:

a processor; and a non-transitory computer-readable storage medium having instructions stored thereupon which are executable by the processor and which, when executed, cause the apparatus to create a bitset optimized inverted index comprising bitsets associated with tokens contained in documents in the document corpus, wherein each bitset comprises a number of binary digits equivalent to the number of documents in the document corpus, and wherein each binary digit in each bitset corresponds to a different document in the document corpus, receive a request to identify the candidate duplicate documents of the document contained in the document corpus, tokenize the document to identify tokens in the document, search the tokens contained in the documents in the document corpus to identify tokens that are in the document and also in at least one document in the document corpus, and utilize the bitsets associated with the identified tokens to select documents in the document corpus as the candidate duplicate documents of the document.

2. The apparatus of claim 1, wherein the tokens contained in the documents in the document corpus are identified through adaptive tokenization of the documents in the document corpus.

3. The apparatus of claim 2, wherein the documents in the document corpus comprise one or more attributes, and wherein adaptive tokenization comprises:

selecting one or more tokenization techniques based upon the attributes; and applying the selected tokenization techniques to the attributes of the documents to identify the tokens contained in the documents.

4. The apparatus of claim 1, wherein the document for which candidate duplicate documents in the document corpus are identified is contained in a second document corpus.

5. The apparatus of claim 4, wherein the second document corpus comprises a corpus of documents obtained from a plurality of document sources on a distributed network.

6. The apparatus of claim 5, wherein the documents in the document corpus and the documents in the second document corpus comprise product records.

7. A non-transitory computer-readable storage medium having computer-executable instructions stored thereupon which, when executed by a computer, cause the computer to:

tokenize the documents in a document corpus to identify tokens contained in the documents in the document corpus;

maintain a bitset associated with each of the tokens in a memory of the computer, wherein each bitset comprises a number of binary digits equivalent to the number of documents in the document corpus, and wherein each binary digit in each bitset corresponds to a unique document in the document corpus;

for each binary digit in each bitset, determine if the token associated with the bitset is contained in the document in the document corpus corresponding to the binary digit, and set the binary digit if the token associated with the bitset appears in the document in the document corpus corresponding to the binary digit; and compress the bitsets in the memory of the computer.

8. The non-transitory computer-readable storage medium of claim 7, having further computer-readable instructions stored thereupon to:

receive a request to identify one or more candidate duplicate documents of a document contained in the document corpus;

tokenize the document to identify tokens in the document;

search the tokens contained in the documents in the document corpus to identify tokens that are in the document and also in at least one document in the document corpus; and utilize the bitsets associated with the identified tokens to select documents in the document corpus as candidate duplicate documents of the document.

9. The non-transitory computer-readable storage medium of claim 8, wherein the document for which the candidate duplicate documents are identified is contained in a second document corpus.

10. The non-transitory computer-readable storage medium of claim 7, wherein the documents in the document corpus comprise one or more attributes, and wherein tokenize the documents in the document corpus to identify tokens contained in the documents comprises:

selecting one or more tokenization techniques based upon the attributes; and applying the selected tokenization techniques to the attributes of the documents to identify the tokens contained in the documents.

11. The non-transitory computer-readable storage medium of claim 10, wherein at least one of the one or more tokenization techniques comprises an orthogonal space bigram tokenization technique.

12. The non-transitory computer-readable storage medium of claim 10, wherein at least one of the one or more tokenization techniques comprises an n-gram tokenization technique.

13. The non-transitory computer-readable storage medium of claim 10, wherein at least one of the one or more tokenization techniques is configured to include an attribute name in the tokens for an attribute.

14. The non-transitory computer-readable storage medium of claim 10, wherein at least one of the one or more tokenization techniques is configured to generate a token for an attribute that includes all of the terms in the attribute.

15. The non-transitory computer-readable storage medium of claim 10, wherein at least one of the one or more tokenization techniques utilizes entity identification.

16. A computer-implemented method for mapping a document to candidate duplicate documents in a document corpus, the method comprising:

creating bitsets in a memory of a computer that are associated with tokens identified in documents in the document corpus, wherein the bitsets comprise a number of binary digits equivalent to the number of documents in the document corpus, and wherein the binary digits correspond to documents in the document corpus;

for the binary digits in the bitsets, determining if the token associated with a bitset is contained in the document in the document corpus corresponding to a binary digit, and setting the binary digit if the token associated with the bitset is contained in the document in the document corpus corresponding to the binary digit; and compressing the bitsets in the memory of the computer.

17. The computer-implemented method of claim 16, further comprising:

receiving a request to map the document to the candidate duplicate documents in the document corpus;

tokenizing the document to identify tokens in the document;

searching the tokens for the documents in the document corpus to identify tokens that are in the document and that are also in at least one document in the document corpus; and selecting documents in the document corpus as the candidate duplicate documents of the document using the bitsets.

18. The computer-implemented method of claim 16, wherein the document is tokenized using adaptive tokenization, and wherein the tokens for the documents in the document corpus are generated using adaptive tokenization.

19. The computer-implemented method of claim 18, wherein adaptive tokenization comprises:

selecting one or more tokenization techniques based upon attributes of a document; and applying the selected tokenization techniques to the attributes of the document to identify the tokens contained in the document.

20. The computer-implemented method of claim 16, wherein the document that is mapped to candidate duplicate documents in the document corpus is contained in a second document corpus.

* * * * *